July 5, 1960     F. J. SEHN ET AL     2,943,750
MATERIAL HANDLING DEVICE
Filed Jan. 28, 1957     4 Sheets-Sheet 1
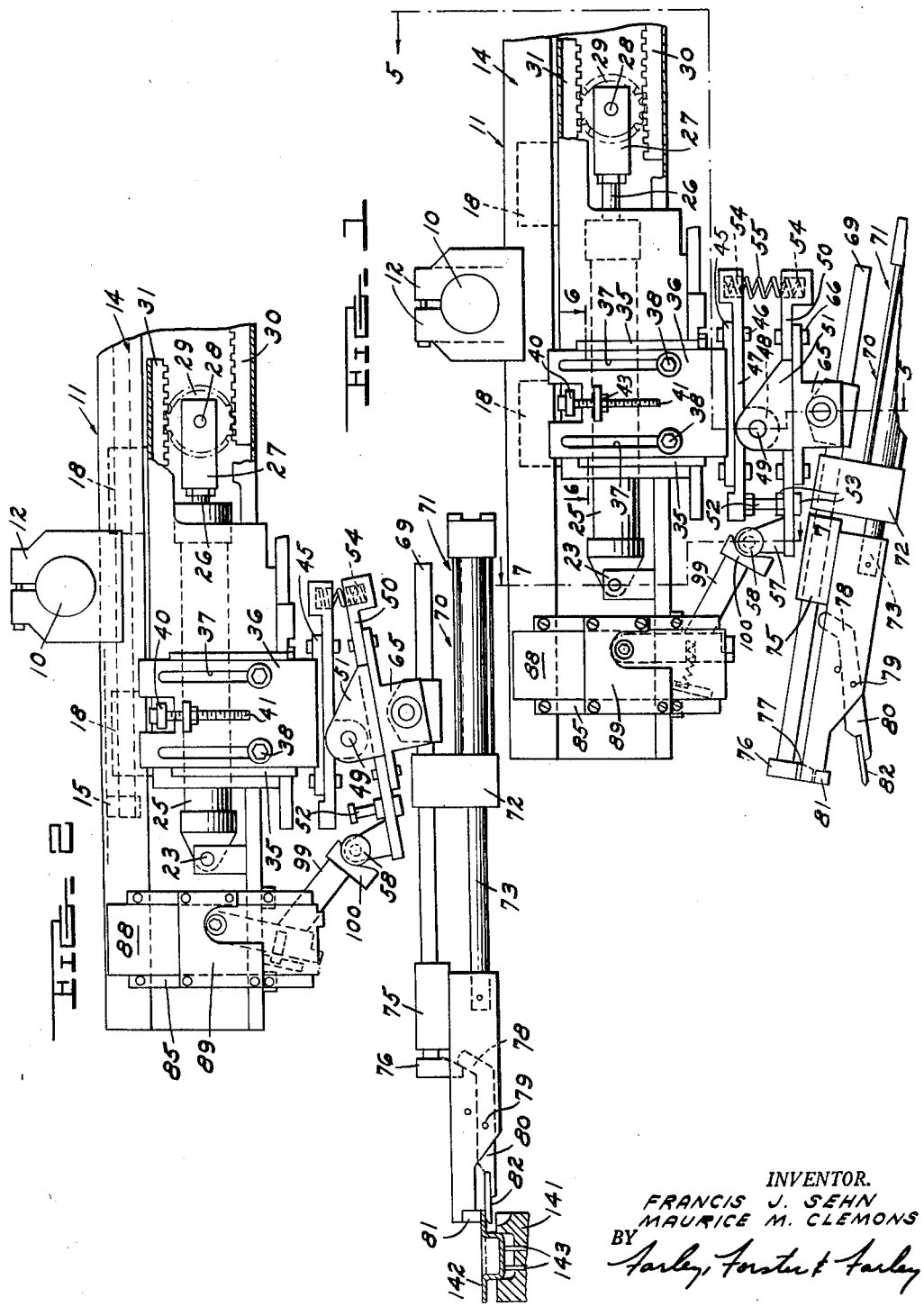
INVENTOR.
FRANCIS J. SEHN
MAURICE M. CLEMONS
BY
ATTORNEYS July 5, 1960
F. J. SEHN ET AL
2,943,750
MATERIAL HANDLING DEVICE
Filed Jan. 28, 1957
4 Sheets-Sheet 2
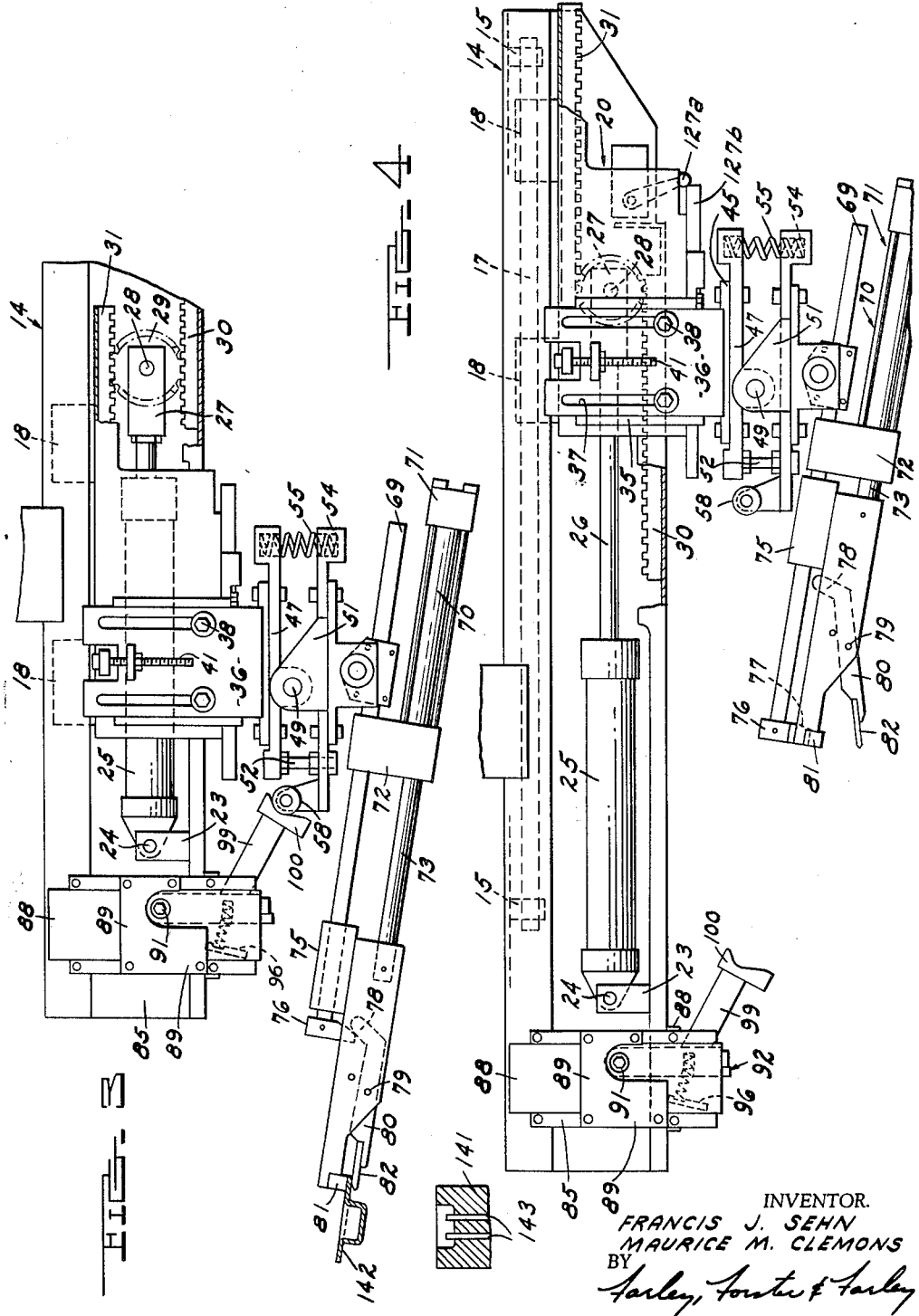
INVENTOR.
FRANCIS J. SEHN
MAURICE M. CLEMONS
BY
Farley, Forster & Farley
ATTORNEYS

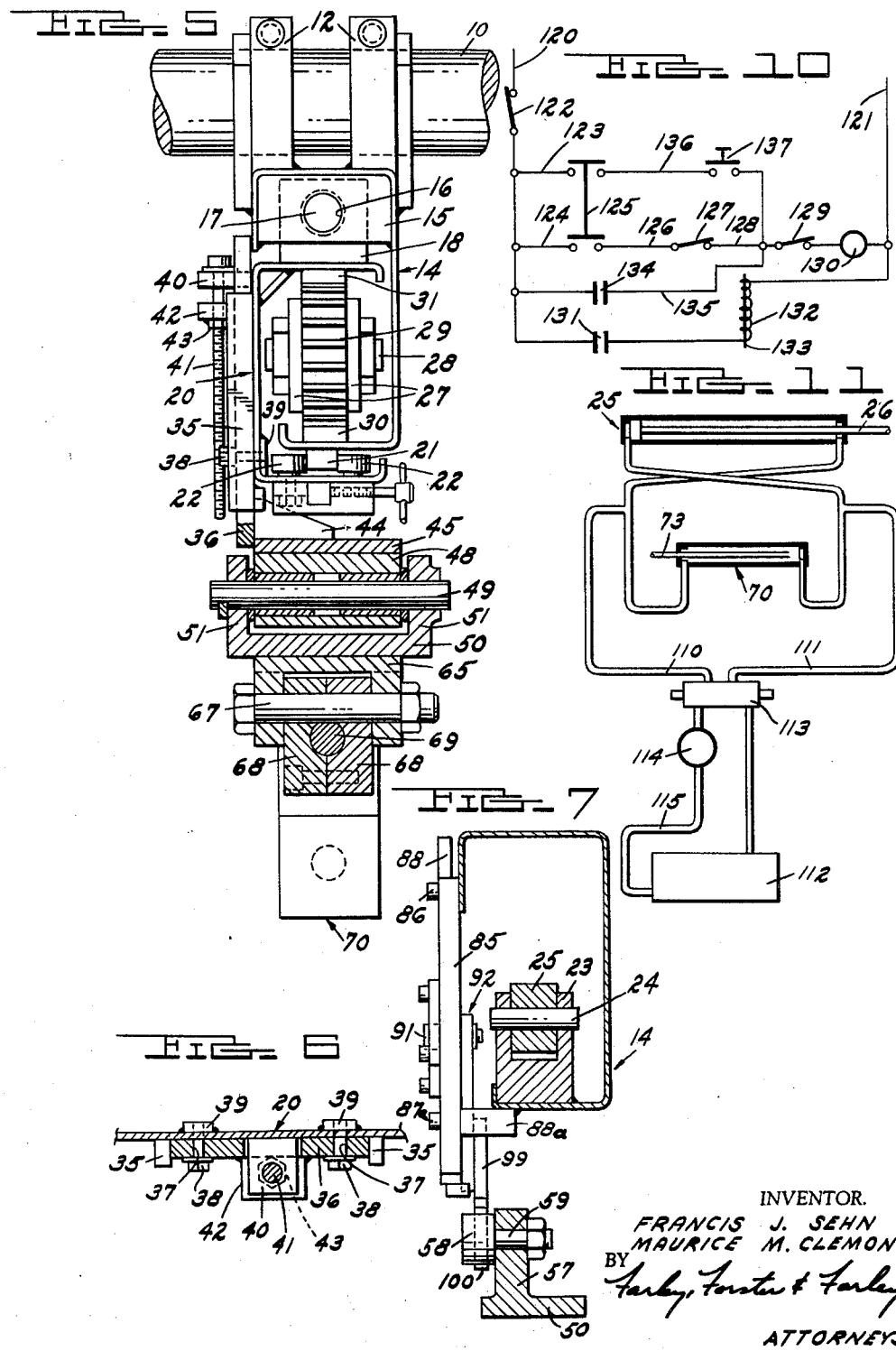

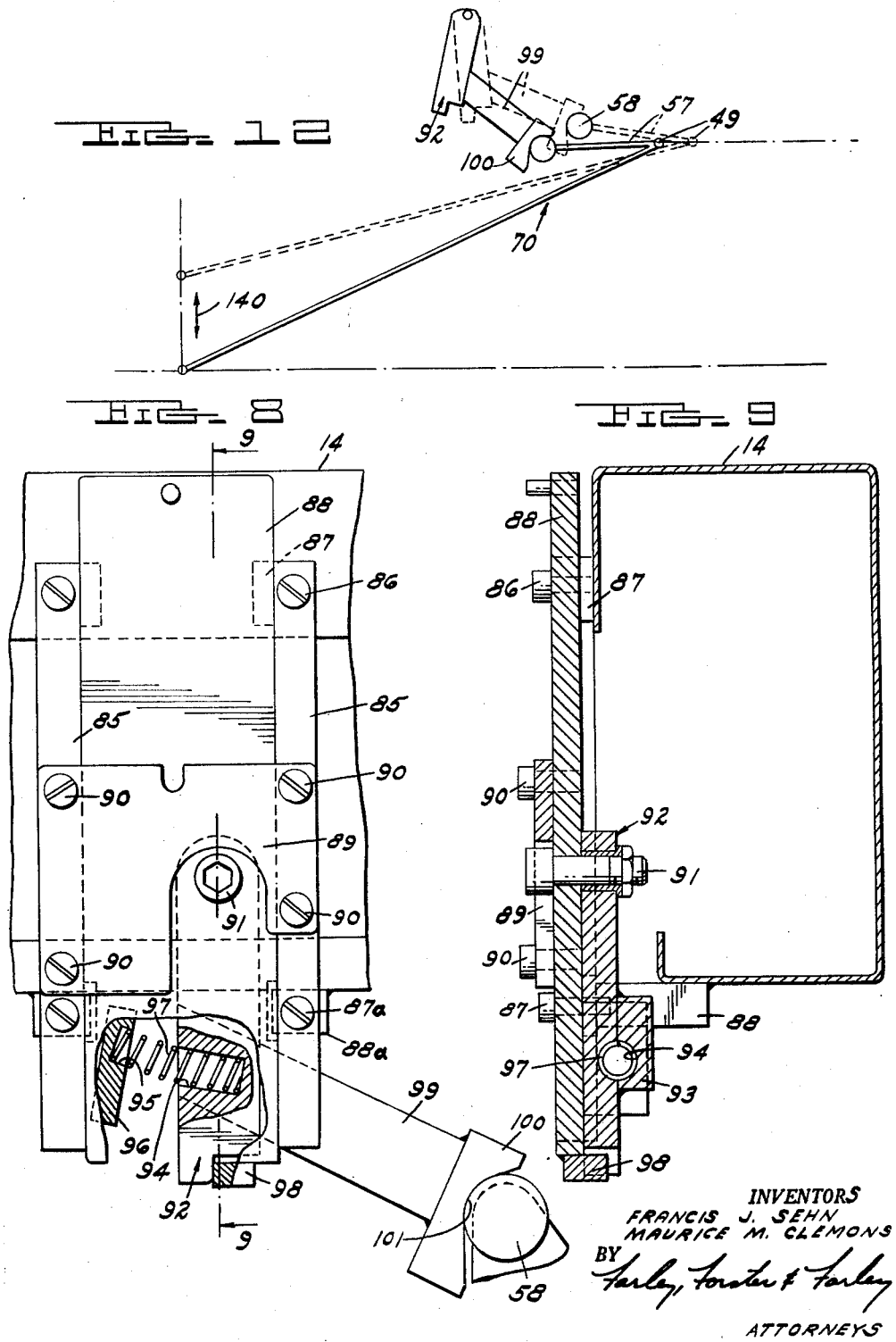

United States Patent Office 2,943,750
Patented July 5, 1960

2,943,750

MATERIAL HANDLING DEVICE

Francis J. Sehn, Detroit, and Maurice M. Clemons, Birmingham, Mich.; said Clemons assignor to said Sehn Filed Jan. 28, 1957, Ser. No. 636,826

3 Claims. (Cl. 214—1)

The present invention relates to a material handling device and, more particularly, to a device for handling material for a press.

In our earlier-filed pending application, filed December 27, 1955, Serial No. 555,413, now Patent No. 2,781,136 issued February 12, 1957, we have disclosed a novel apparatus particularly adapted for the unloading of articles from a press or similar production machine. The present invention constitutes an improvement upon and refinement of this earlier disclosed device, and this application is a continuation-in-part of said application Serial No. 555,413.

The present invention is of particular utility in the unloading of a press in which the formed article must be elevated to insure removal of the article from the press. For example, in the formation of deep drawn or dished parts, the female die is usually the lower die element, and it is often difficult to provide knockout or elevating pins of sufficient length to elevate the parts to clear the female die recess. The device herein disclosed engages such a dished part, elevates the part in a true vertical path to clear the die, and then retracts the part from the press.

The part-engaging elements of the device of this invention are substantially the same as those disclosed in our earlier application, as are the elements effective to retract the part from the press. The present invention is concerned primarily with the means for elevating the part after it has been engaged, but prior to its effective longitudinal retraction from the press.

The device of the present invention utilizes a pair of relatively longitudinally displaceable frames adapted to bodily retract a part-engaging jaw assembly, together with a part engaged thereby from the press. To obtain vertical movement of the part, the jaw assembly is pivotally connected to the movable one of the frames for relative movement in a vertical plane. The relative pivotal jaw-frame movement is correlated with the longitudinal displacement of the one frame, the jaw assembly and the pivot point interposed therebetween. Thus, the part actually moves initially in a true vertical plane, so that the part clears the die cavity, before longitudinal displacement of the part can occur.

This correlation of pivotal movement and longitudinal displacement, to obtain rectilinear part movement in a sequential vertical and longitudinal pattern, can be accomplished in any desired manner. For example, a roller longitudinally displaceable with the movable frame can contact a pivoted arm on the fixed frame, so that longitudinal movement of the pivot point effects vertical movement of the pivoted jaw assembly about the pivot point to a degree which compensates for the longitudinal vector travel of the jaw and only a vertical vector travel of the jaw is obtained. Consequently, the jaw moves truly vertically so long as the follower contacts the swinging arm and then, preferably, moves in a single longitudinal plane after the follower has left the arm.

It is, therefore, an important object of the present invention to provide a novel press handling apparatus particularly adapted for the unloading of parts from a die cavity.

Another important object of this invention is the provision of an improved press unloading apparatus effective to sequentially move a part from a press operative position in a vertical and then in a longitudinal direction.

It is a further object to provide an apparatus for unloading dished parts from a press when the part is carried by a pivoted jaw assembly longitudinally displaceable with respect to the press in such a manner that the part is moved vertically and then longitudinally.

Still another important object is the provision of a press unloading apparatus wherein a jaw assembly is carried by a longitudinally displaceable frame for joint vertical and longitudinal displacement, the longitudinal and vertical displacement of the jaw assembly being correlated so that a part carried by the jaw is moved truly vertically and longitudinally with respect to a press.

It is a yet further object of this invention to provide an improved press handling apparatus for the removal of a dished part from a recessed female die by initially elevating the part so as to clear the die and then displacing the part longitudinally from registry with the die to a position exterior of the press.

Other and further objects will be more apparent from the following detailed description of a preferred embodiment of our invention and by reference to the drawings forming a part hereof wherein.

On the drawings:

Figure 1 is a side elevational view, with parts broken away and in section, illustrating a material handling device of the present invention immediately prior to assuming its "at rest" position, at which the device is conditioned for its next part removal operation;

Figure 2 is a fragmentary elevational view similar to Figure 1, but illustrating the device in its part-engaging position at which a part is engaged by the device prior to being removed from the press;

Figure 3 is an elevational view similar to Figures 1 and 2 illustrating the device with the part-engaging jaw in elevated position;

Figure 4 is an elevational view similar to Figures 1–3, inclusive, but illustrating the device in its fully retracted position at which the part has been removed from the press and released by the part-engaging jaw;

Figure 5 is an enlarged sectional view taken along the planes 5—5 of Figure 1;

Figure 6 is an enlarged sectional view taken along the plane 6—6 of Figure 1;

Figure 7 is an enlarged sectional view taken along the planes 7—7 of Figure 1;

Figure 8 is an enlarged, elevational view illustrating the swingable actuating arm in greater detail;

Figure 9 is a sectional view taken along the plane 9—9 of Figure 8;

Figure 10 is a diagrammatic view of the electrical control circuit for the device of the present invention;

Figure 11 is a diagrammatic illustration of the fluid-pressure actuating system of the device of the present invention; and Figure 12 is a schematic illustration of the path of travel of the part-engaging jaw and the manner in which it is modified by the swinging arm and follower mechanism.

As shown on the drawings:

In Figures 1, 4 and 5, reference numeral 10 refers generally to a supporting element from which a material handling device 11 of the present invention is supported. More particularly, the supporting element 10 may suitably comprise a transversely-extending rod to which the device 11 is attached by means of a pair of bifurcated brackets 12 (Figure 5), the bracket being welded or otherwise suitably secured to a fixed, sheet metal frame 14.

The frame 14 is generally U-shaped and is provided adjacent its upper end with a pair of longitudinally spaced hanger brackets 15 which are apertured, as at 16, to receive a longitudinally-extending guide rod 17 fixedly secured in the aperture 16. The guide rod 17 slidably receives thereon a pair of upwardly projecting slide blocks 18 which are adapted to be suspended from the rod 17 to guidably journal thereon a longitudinally displaceable frame indicated generally at 20. The movable frame 20 is also generally U-shaped and is complementary to the fixed frame 14 so that portions of the frames 14 and 20 are nested, as best illustrated in Figure 5.

The frames 14 and 20 are guided for relative telescopic movement by means of a depending longitudinally-extending guide key 21 adapted to be engaged on the transversely opposing sides thereof by rollers 22 supported on the movable frame 20 for rotation about vertically extending axes. The frames 14 and 20 are thus guided for relative reciprocal or telescopic movement by the guide rods 17, with the key 21 and the rollers 22 preventing unwarranted pivotal movement of the frames relative to one another about the axis of the guide rod 17.

Carried by the fixed frame 14 is an upstanding bifurcated post 23 (Figure 7) which has pivoted to the upper end thereof, as at 24, a generally longitudinally-extending, fluid pressure actuated piston and cylinder assembly 25. This piston and cylinder assembly 25 has projecting from its opposite end a piston rod 26 which carries a support bracket 27 journalling therebetween, as at 28, a freely rotatable pinion 29. This pinion 29 is interposed between and is in meshing engagement with a pair of racks, the lower one of these racks, indicated at 30, being fixed to the fixed frame 14 and the upper of these racks, indicated at 31, is fixed to the movable frame 20.

It will be appreciated that actuation of the piston and cylinder assembly 25 to project the rod 26 longitudinally would effect longitudinal displacement of the pinion 29. The toothed engagement of the pinion 29 with the fixed rack 30 will cause rotation of the pinion, and such rotation of the pinion will longitudinally displace the upper rack 31. The displacement of the upper rack 31, together with the movable frame 20 to which it is attached, will be caused by the combined effect of longitudinal displacement of the pinion 29 and rotation of the pinion 29. Thus, the gearset composed of the pinion 29, the rack 30 and the rack 31 will effect longitudinal relative telescopic movement of the movable frame 20 with respect to the fixed frame 14, the degree of displacement of the movable frame 20 being greater than the stroke of the cylinder and piston assembly 25. In other words, the pinion 29 and the racks 30, 31 form an overspeed gearset in which the pinion 29 is the input member, the rack 30 is the reaction member, and the rack 31 is the output member.

This construction of the fixed frame 14, the movable frame 20, the gearset composed of the gearing elements 29, 30 and 31, and the relative telescopic movement of the frame is substantially the same as that disclosed in our above-identified earlier-filed application.

Fixed to the exposed side of the movable frame 20 are a pair of fixed, vertically elongated guide elements 35 (Figs. 1, 5 and 6). Interposed between these guide elements 35 and in slidable contact therewith is a vertically adjustable slide plate 36. This slide plate 36 is guided for vertical movement relative to the movable frame 20 by the guides 35 and also by elongated slots 37 formed in the plate 36 and adapted to receive therethrough clamping bolts 38 received by suitable threaded means on the movable frame, such as nuts 39 welded to the inner surface of the movable frame, as best illustrated in Figure 5.

For accurate adjustment of the plate 36 relative to the movable frame 20, the frame has welded thereto a laterally projecting abutment 40 apertured to receive therethrough a depending adjustment screw 41, the depending screw passing through an apertured abutment plate 42 secured to the plate 36 and having welded to the under surface thereof a nut 43 threadedly receiving the adjustment screw 41.

The plate 36 has secured to the lower edge thereof an inturned flange 45, the flange 45 being secured to the plate 36 by suitable means, as by attachment flanges 44 welded to both the plate 36 and the flange 45. The flange 45 is secured, as by bolts 46, through an upper or fixed plate 47 forming a part of the pivot assembly of the present inveniton.

This upper plate 47 is provided with a depending, medial boss 48 which is transversely apertured to receive a pivot pin 49 which is suitably journalled in the boss. The pin 49 is effective to connect the upper plate 47 to a lower pivot plate 50 which has laterally spaced, upwardly projecting ears 51 receiving the pin 49. The plates 47 and 50 are thus capable of relative pivotal movement about the axis of the transverse pin 49.

Carried by the plate 50 and located forwardly of the pivot 49 is an adjustable stop comprising a bolt 52 threadedly received by nuts 53 positioned on either side of the plate 50. Located at the rearward end of the plates 47 and 50, i.e., on the other side of the pivot pin 49 from the stop 52, are a pair of vertically registering internal recesses 54 within which are disposed the vertically spaced extremities of a compression spring 55. The compressive strength of the spring 55 normally maintains the stop bolt 52 in contact with the under surface of the upper plate 47, the springs being compressible to accommodate relative tilting movement between the plates 47 and 50.

Located at the forward end of the plate 50 is an upwardly extending flange or post 57 which carries a laterally projecting roller or follower 58 journalled for rotation about a transverse axis defined by a roller shaft 59 (Figure 7).

As best shown in Figure 5, the lower plate 50 is secured to a depending U-shaped bracket 65 secured to the plate 50 by suitable means, as by bolts 66, and carrying a transversely extending bolt 67 for securing the bracket 65 to a pair of separable clamping plates 68 adapted to clamp therebetween a longitudinally adjustable, normally fixed guide rod 69 forming a part of a part-engaging jaw assembly indicated generally at 70. The jaw assembly 70 is suspended from the guide rod 69 and comprises a lower, longitudinally extending cylinder and piston assembly 71 which is clamped or otherwise secured to the guide rods 69 by an attachment bracket 72.

The piston 73 of the cylinder and piston assembly 71 projects forwardly for attachment to a jaw element 74 which is guidable, as by a bracket 75 embracing the guide rods 69, for longitudinal displacement upon extension of the piston rod 73. Located at the remote forward end of the guide rods 69 is a fixed abutment 76 having an inclined cam surface 77 which is cooperable with the upturned rear cam end 78 of a pivoted clamping finger 80 which is pivoted, as at 79, to the jaw element 74. The jaw element 74 carries as its forward upper end a depending, fixed clamping finger 81 which is cooperable with a forward extension 82 of the pivotal finger 80. The finger 80 is overbalanced forwardly so that it normally occupies the position shown in Figure 1, wherein the clamping fingers 81 and 82 are open. Upon forward projection of the piston rod 73, to the position illustrated in Figure 2, the rear cam end 78 of the finger 80 contacts the fixed cam 77 on the guide rods 69, and the fingers 81, 82 are cammed to their closed or clamping position. Retraction of the piston rod 73 will remove the cam end 78 of the finger 80 from contact with the fixed cam 77 and the finger will again be moved to its open position, as is illustrated in Figure 1.

As best shown in Figures 8 and 9, the forward end of the fixed frame member 14 is provided with a pair of longitudinally-spaced, vertically-extending guide elements 85 secured to the fixed element by suitable means, as by upper screws 86 and lower screws 87a which are received by filler blocks 88a. These guide elements 85 have upper spacer projections 87 which slidably contact the undersurface of a vertically-adjustable carrying plate 88. The plate 88 fits snugly between guide elements 85 and is adapted to be clamped in an adjusted vertical position by a clamping plate 89 which is in flush surface contact with the exterior surface of the plate 88 and adapted to be retained in clamping contact therewith by clamping screws 90.

The vertically adjustable plate 88 carries a transversely extending pivot bolt or shaft 91 which journals a depending swingable actuating arm, indicated generally at 92. The arm 92 is provided with a lateral boss 93 intermediate its length and either rigidly secured thereto or formed integrally therewith. The boss 93 and the adjacent portion of the arm 92 define an interior cylindrical recess 94 which is generally longitudinally aligned with a complementary recess 95 formed in a reaction plate 96 carried by the adjustable plate 88. Interposed between the reaction plate 96 and the arm 92 is a coiled compression spring 97 which serves to urge the arm rearwardly to the position shown in Figures 1 and 8, the spring 97 urging the arm against an abutment 98 located at the extreme lower end of the adjustable plate 88.

The freely slidable arm 92 is provided with a forward projection 99 which may suitably be formed as a continuation of the boss 93, and which has at its forward end an abutment element or saddle 100 provided with an arcuate recess 101 formed at its free forward edge for matingly receiving the follower or roller 58 heretofore described and mounted upon the lower plate 50 of the pivot assembly.

Control system

Fluid pressure for arcuating the cylinders 25 and 71 is provided by the pneumatic actuating circuit shown in Figure 11. This circuit includes a pair of conduits 110 and 111 which communicate with a reservoir 112 through a control valve 113 and a regulating valve 114, the regulating valve being interposed in the pressure supply line 115 from the reservoir 112. The control valve 113 is actuated, as hereinafter described in greater detail, to control the flow of pressure fluid from the supply line 115 into selected one of the conduits 110 and 111 which communicate, respectively, with opposite ends of the cylinders 25 and 71. For example, the conduit 110 is effective to retract the actuating rod 26 of the cylinder 25 and to retract the rod 73 of the cylinder 71, while fluid pressure in the line 111 is effective to extend the respective rods 26 and 73. When the pneumatic system is in its condition illustrated in Figure 11, and the pistons and rods occupy their relative positions as shown therein, the machine is "at rest"; i.e., both of the actuating rods are retracted, the movable frame element 20 is in its furthest left position (as shown in Figure 1) at which it is telescoped within the fixed frame 14, and the gripping finger 82 is spaced from the cooperating abutment 81, inasmuch as the cylinder and piston assembly 71 is retracted.

The means for actuating the valve 113 to effect cyclic operation of the cylinder and piston assemblies 25 and 71 is schematically illustrated in the wiring diagram of Figure 10, wherein current of the desired voltage and from a convenient source enters the circuit through lead lines 120 and 121. A manual "off-on" switch 122 is provided in the lead line 120, and branch lead lines 123 and 124 connect the lead line 120 to the opposite sides of a dual action selector switch 125. When the switch 125 is in its "auto" position, indicating automatic operation, this switch connects the line 124 to a line 126 which leads to a press switch 127 which is closed, to its position shown in Figure 10, whenever the press operation has ceased and the press is open. When the press is in its operating or closed position, the switch 127 is open. Closure of the switch 127 will energize the line 128 connected through a limit switch 129 and a circuit relay 130 to the other lead line 121. The relay 130 is effective to operate contacts 131 connected through the coil windings 132 of a solenoid having a core 133. When the relay contacts 131 are closed, the solenoid windings 132 are energized, moving the solenoid core 133 to actuate the valve 113, thereby moving the valve 113 to its position to interconnect the fluid lines 115 and 111. When the solenoid winding 132 is de-energized, the valve 113 is actuated, preferably under a spring load, to a position at which it interconnects the pressure line 115 and a conduit 110.

The relay 130 and its contacts 131, in effect, form a holding circuit to maintain the solenoid energized even though the press switch 127 may be opened by return of the press to its actuated or closed position. This holding circuit is completed from the lead line 120 and additional relay contacts 134 through a conductor 135 bypass the press switch 127. However, upon opening the limit switch 129, the relay 130 is de-energized, the contacts 131 are opened, the solenoid winding 132 is de-energized, and the solenoid core 133 will accommodate the position of valve 113 to interconnect the fluid pressure lines 115 and 110.

For manual operation, the switch 125 is actuated to close a circuit between branch line 123 and line 136 which passes through a push-button switch 137 to the limit switch 129 and the relay 130. Thus, manual operation is obtained by by-passing the press switch 127, and the same cycle will be performed as hereinbefore described, with the exception that the cycle will be manually initiated.

The location of the limit switch 127 and the manner of its actuation will be readily understood by an inspection of Figure 4 of the drawings, wherein a limit switch arm 127a is contacted by an adjustable abutment 127b carried by and movable with the movable frame element 20. When the movable frame element is moved to its furthest right-hand or extended position, the limit switch 127 is actuated through the arm 127a.

Operation

The operation of the present invention can probably be best understood by an inspection of Figures 1–4, inclusive, and the diagram of Figure 12.

In Figure 1, the apparatus is illustrated as it approaches its "at rest" position. It will be noted that the piston rod 26 is substantially retracted within the cylinder 25 to retract the movable slide or frame element 20 within the fixed frame element 14. Further retraction of the rod 26 will cause forceable abutment between the follower or roller 58 and the saddle block 100 of the swingable arm 92. Continued movement of the movable frame to the left will effect pivoting movement of the arm 92 about its pivot axis 91 and against the force of the compression spring 97. Consequently, the follower 58 will be depressed in a path determined by the arcuate path movement of the arm 92 about its axis 91, the movement of the follower 58 about its axis 49 and the continued forward displacement of the follower 58 and its axis 49 by movement of the movable frame 20.

This combination of arcuate movement and longitudinal displacement will result in the displacement of the jaw assembly in a linear, substantially vertical direction as indicated schematically by the directional arrow 140 of Figure 12. Inasmuch as the jaw assembly is in its retracted position, i.e., with the rod 73 retracted within the cylinder 71, the vertical movement of the jaw assembly occurs in longitudinally spaced relation with respect to the press and, more particularly, with respect to the press dies, one of which is illustrated at 141 in Figure 2. Thus, in the "at rest" position of the apparatus, the movable frame 20 is in its retracted telescoped position relative to the fixed frame 14, the pivoted arm 92 has depressed the follower 58 to pivot the jaw assembly about its axis 49 to a position at which the axis of the jaw assembly movement is substantially parallel to the axis of relative frame movement.

Now, let us assume that the press opens to expose a part 142 therein, the part preferably being elevated by lift-out pins 143. This movement of the press will close the press switch 127, thereby energizing the relay 130 and closing the relay contacts 131. The resultant energization of the solenoid coil 132 will move the valve 113 to interconnect the fluid supply line 115 and the fluid conduit 111 which is connected to the left-hand side of the cylinder 25 and the right-hand side of the cylinder 71. Thus, actuation pressure from the reservoir 112 is simultaneously vented to both cylinders. Because of the presence of the overspeed gear set comprising the input pinion 29, the reaction rack 30 and the output rack 31, there will be greater resistance to movement of the actuating rod 26 and to movement of the actuating rod 73. Consequently, the rod 73 will be actuated to extend the jaw assembly toward the part 142. The extension of the rod 73 will bring the cooperating jaw elements 81 and 82 into juxtaposition to the part 142 and when the projection 78 on the lower finger 80 contacts the cam 77, the part 142 will be grasped by the jaw elements 81 and 82, as illustrated in Figure 2 of the drawings. This final closing of the jaw elements 81, 82 will occur at the extreme end of the extension stroke of the rod 73.

Next, the increased pressure in the line 111 will actuate the cylinder 25 to extend the rod 26 to the right. Extension of the rod 26 will, through the overspeed gearset, initiate displacement of the movable frame 20 to the right, i.e., away from the press. However, this initial displacement of the movable frame does not displace the jaw assembly longitudinally. The pivot point 49 of the pivot assembly will be displaced longitudinally, but the follower 58 in contact with the saddle 100 of the arm 92 will be displaced vertically as well as longitudinally because of movement of the arm 92 about its pivot axis 91. Additionally, the follower 58 is retracted longitudinally because of its connection through its pivot point 49 to the movable frame 20. The combined longitudinal and vertical displacement of the follower 58 will result in truly vertical movement of the jaw assembly, as illustrated in Figures 3 and 12, so long as the follower 58 stays in contact with the arm saddle 100. When the arm 92 abuts the stop 98, the follower 58 is effectively released for longitudinal displacement only, and the jaw assembly is then displaced longitudinally from its position of Figure 3 to its position of Figure 4.

When the abutment 127b on the movable frame 20 contacts the limit switch arm 127a, the limit switch 127 is moved to its open position, thus de-energizing the relay 130, opening the relay points 131 and de-energizing the solenoid winding 132. The fluid supply line 115 is then connected to the conduit 110 so that a retracting force is applied to both the cylinders 25 and 71. Again, due to the overspeed gearing and the mechanical disadvantage at which the cylinder assembly 25 operates, the rod 73 is first retracted to move the finger projection 78 from the cam surface 77, allowing the jaw finger 82 to move away from the jaw abutment 81, thereby releasing the part. After retraction of the rod 73 is completed, the rod 26 is retracted to move the frames 14 and 20 relatively so that the frame 20 is retracted to its "at rest" position. The unloading assembly will remain in its "at rest" position until such time as the press again opens to close the switch 127, so that the foregoing cycle may be repeated.

It will be appreciated that the present invention provides a new and novel press unloading apparatus wherein a part is removed from a press in an initial, truly vertical direction prior to its longitudinal retraction or removal from the press. The swinging arm 92 and the follower 58 provide operating means which correlates the arcuate movement of the part-engaging jaw assembly with the longitudinal movement of the jaw assembly to effect rectilinear and sequential vertical and longitudinal movement. Actually, the operating means are effective to limit tilting movement of the jaw assembly so that initial relative longitudinal displacement of the frame elements 14 and 20 is converted into movement of the jaw assembly in a plane normal to the plane of the relative frame displacement. Thus, the part is initially moved linearly vertically and subsequently displaced linearly longitudinally. Additionally, only the jaw assembly is moved vertically, the relative frame movement being confined to a plane which is substantially horizontal or substantially parallel to the press working plane. In the illustrated embodiment of the invention, the press working plane is substantially horizontal, although it will be appreciated that this plane may vary with various press constructions. With reference to the press working plane, the part is preferably thus sequentially moved in a plane normal to the press working plane and then in a plane parallel to the press working plane.

While a preferred embodiment of our invention has been disclosed and described above in detail, it will be understood that numerous modifications might be resorted to without departing from the scope of our invention as defined in the following claims.

We claim:

1. In a material handling apparatus for a press, a first fixed supporting frame, a second movable frame carried by said first frame for longitudinal movement in a single plane, actuating means for said second frame, means on said second frame defining a pivot axis, workpiece-engaging means including gripping jaws disposed on said pivot axis for pivotal movement relative to said second frame and for longitudinal displacement therewith, a swingable arm on said first frame disposed in the path of movement of said workpiece-engaging means, and abuttable means carried by said workpiece-engaging means for contact with said arm to establish pivotal movement of said workpiece-engaging means and vertical movement of said gripping jaws during a predetermined portion of the relative longitudinal movement between said frames.

2. In a material handling apparatus for a press as set forth in claim 1, a limit stop for said swingable arm, resilient means urging said swingable arm against said limit stop, a limit stop for said workpiece engaging means, resilient means urging said workpiece engaging means against said latter limit stop, and interengagement surfaces between said abuttable means and swingable arm providing reaction forces overcoming said respective resilient means during said relative longitudinal movement between said frames.

3. In a material handling apparatus for a press as set forth in claim 1, the relative pivot positions of said swingable arm and said workpiece engaging means and the position of contact between said swingable arm and abuttable means relative to the respective pivotal axes and gripping jaws providing a path of movement of said gripping jaws substantially at right angles to the path of movement of said movable frame during said predetermined portion of relative longitudinal movement between said frames.

References Cited in the file of this patent

UNITED STATES PATENTS

| | | |
|---|---|---|
| 1,959,512 | Wall | May 22, 1934 |
| 2,763,229 | Sahlin | Sept. 18, 1956 |
| 2,781,136 | Sehn et al. | Feb. 12, 1957 |
| 2,811,266 | Udal | Oct. 29, 1957 |